United States Patent
Lee et al.

(10) Patent No.: US 11,784,832 B2
(45) Date of Patent: Oct. 10, 2023

(54) AUTOMATICALLY MANAGING USER MESSAGE CONVEYANCE UTILIZING MULTIPLE MESSAGING CHANNELS

(71) Applicant: Indeed, Inc., Austin, TX (US)

(72) Inventors: Michael Lee, Pasadena, CA (US); Shannon Ohara Boon, Austin, TX (US); Philippe P. Dage, Seattle, WA (US); Bassam Mehanni, Sunnyvale, CA (US); Scott Warriner, Sunnyvale, CA (US); Arun Kumar Gnanamani, Pleasanton, CA (US)

(73) Assignee: INDEED, INC., Austin, TX (US)

( * ) Notice: Subject to any disclaimer, the term of this patent is extended or adjusted under 35 U.S.C. 154(b) by 0 days.

(21) Appl. No.: 17/331,471

(22) Filed: May 26, 2021

(65) Prior Publication Data
US 2023/0216836 A1    Jul. 6, 2023

Related U.S. Application Data

(60) Provisional application No. 63/030,287, filed on May 26, 2020.

(51) Int. Cl.
*H04L 9/40* (2022.01)
(52) U.S. Cl.
CPC .............. *H04L 63/0428* (2013.01)
(58) Field of Classification Search
CPC .................................. H04L 63/0428
USPC .......................................... 726/14
See application file for complete search history.

(56) References Cited

U.S. PATENT DOCUMENTS

| | | | | |
|---|---|---|---|---|
| 9,160,806 B1 * | 10/2015 | Ledet | ............... | H04L 51/02 |
| 9,391,947 B1 * | 7/2016 | Agarwal | ............... | G06F 16/958 |
| 10,911,379 B1 * | 2/2021 | Bray | ............... | H04L 51/18 |
| 2017/0026328 A1 * | 1/2017 | Adkins | ............... | H04L 51/42 |
| 2017/0359778 A1 * | 12/2017 | Chen | ............... | H04L 67/55 |
| 2018/0077105 A1 * | 3/2018 | DeGraide | ............... | H04L 51/063 |
| 2018/0278605 A1 * | 9/2018 | Fitterer | ............... | H04L 12/1822 |
| 2018/0351898 A1 * | 12/2018 | Lindeman | ............... | H04L 51/046 |
| 2019/0036863 A1 * | 1/2019 | Bonham | ............... | G06F 40/289 |
| 2019/0312826 A1 * | 10/2019 | Patel | ............... | G06F 3/04883 |

(Continued)

*Primary Examiner* — Amare F Tabor
(74) *Attorney, Agent, or Firm* — Young Basile Hanlon & MacFarlane, P.C.

(57) ABSTRACT

A method, system and/or computer usable program product for automatically managing the conveying of messages among multiple communication channels including (i) receiving, from a first computing system, an on-line message addressed to a user, (ii) automatically categorizing the message among a predetermined set of message categories stored in memory, (iii) identifying a set of on-line message channels preselected by the addressee user for receiving messages for each of the predetermined set of message categories, (iv) identifying a set of performance metrics stored in memory for optimizing message channel selection, (v) utilizing the performance metrics to automatically select an optimum message channel from the preselected message channels for sending the categorized message to a second computing system of the addressee user, (vi) automatically formatting the categorized message for the optimum message channel, and (vii) sending the formatted message on-line to the second computing system of the addressee user across the optimum message channel.

21 Claims, 5 Drawing Sheets

(56) References Cited

U.S. PATENT DOCUMENTS

2020/0076746 A1* 3/2020 Penrose ................ H04L 51/046
2020/0152183 A1* 5/2020 Wang ...................... G10L 15/30
2020/0356629 A1* 11/2020 Tan ....................... G06F 40/289

* cited by examiner

AUTOMATICALLY MANAGING USER MESSAGE CONVEYANCE UTILIZING MULTIPLE MESSAGING CHANNELS

BACKGROUND

Cross-Reference to Related Applications

The present application claims priority to U.S. Provisional Patent Application No. 63/030,287, filed May 26, 2020, entitled "Systems and Methods to Enhance Technology Including Employment and Security Related Technology", which is incorporated herein by reference.

Technical Field

The present invention relates generally to a communication system for automatically managing the conveyance of messages with users of computing systems, and more specifically to a computer implemented method for managing messaging channel selection for each user.

Description of Related Art

With the advent of on-line communications across the internet, many different communication channels have been developed for sending and receiving messages. These include emails, SMS (short message service) based texts, social media based applications such as WhatsApp and Facebook Messenger as well as other types of messaging channels that users may utilize to send and receive messages. Generally a user selects a communication channel for sending a message to another user, then composes and sends the message to another user across that channel.

Various service companies now utilize a variety of communication channels for providing services on-line. For example, job providers and job seekers may utilize an on-line employment service for identifying and filling job opportunities. These jobs may be posted on-line by job providers through the on-line employment service for querying and accessing on-line. The job providers and job seekers may then communicate with each other through an email messaging channel provided by the on-line employment service towards scheduling interviews and other tasks to fill the posted job.

SUMMARY

The illustrative embodiments of the present invention provide a method, system, and/or computer usable program product for automatically managing the conveying of messages among multiple communication channels including receiving, from a first computing system, an on-line message addressed to a user; automatically categorizing the message among a predetermined set of message categories stored in memory; identifying a set of on-line message channels preselected by the addressee user for receiving messages for each of the predetermined set of message categories; identifying a set of performance metrics stored in memory for optimizing message channel selection; utilizing the performance metrics to automatically select an optimum message channel from the preselected message channels for sending the categorized message to a second computing system of the addressee user; automatically formatting the categorized message for the optimum message channel; and sending the formatted message on-line to the second computing system of the addressee user across the optimum message channel.

BRIEF DESCRIPTION OF THE DRAWINGS

The novel features believed characteristic of the invention are set forth in the appended claims. Embodiment of the invention itself, further objectives and advantages thereof, as well as a preferred mode of use, will best be understood by reference to the following detailed description of illustrative embodiments when read in conjunction with the accompanying drawings.

DETAILED DESCRIPTION

Processes and devices may be implemented and utilized for automatically managing the conveyance of messages with users across multiple messaging channels between computing systems including managing channel selection for each user. These processes and apparatuses may be implemented and utilized as will be explained with reference to the various embodiments below.

Figure 1:
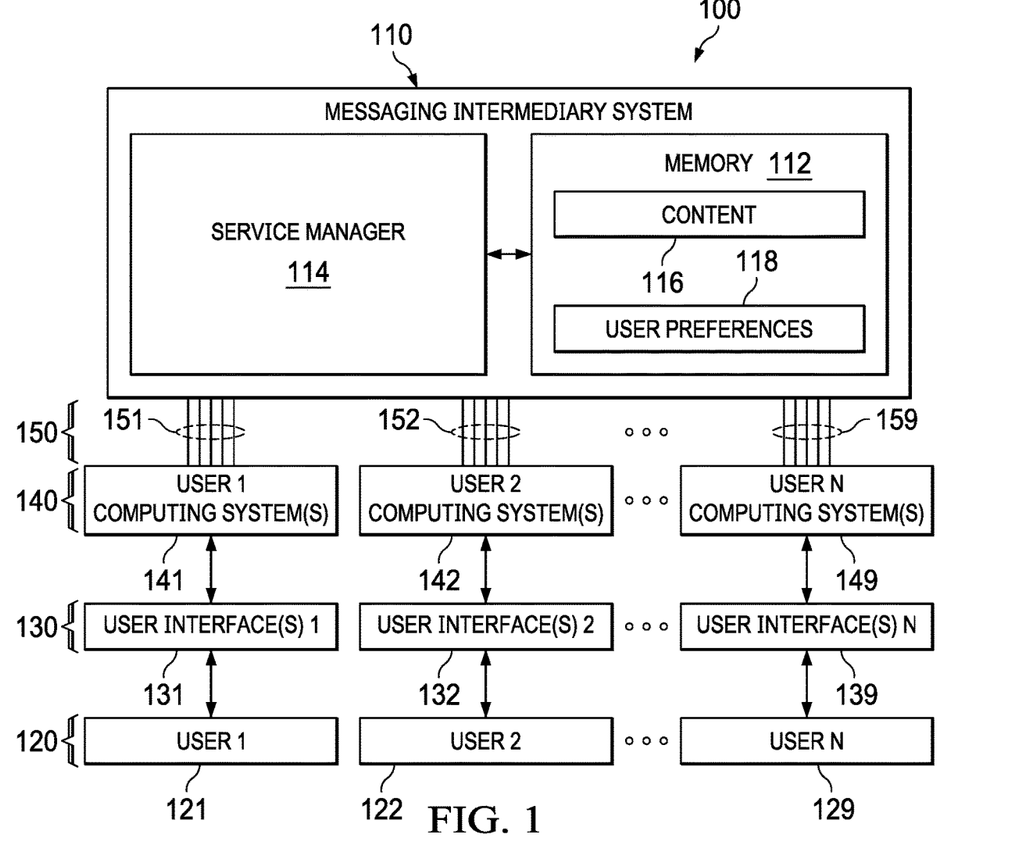
FIG. 1 provides a high level block diagram of a communication system managing the automatic conveyance of messages with users utilizing multiple messaging channels between computing systems, in which various embodiments of the present disclosure may be implemented.
Figure 2:
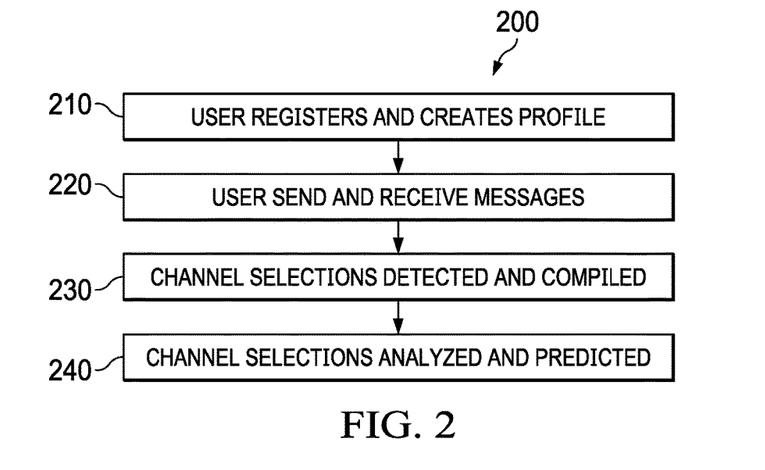
FIG. 2 provides a high level flow diagram of the communication system managing the automatic conveyance of messages with users utilizing multiple messaging channels between computing systems, in which various embodiments of the present disclosure may be implemented.

FIG. 1 provides a high level block diagram of a communication system 100 managing the automatic conveyance of messages with users utilizing multiple messaging channels between computing systems, in which various embodiments of the present disclosure may be implemented. FIG. 2 provides a high level flow diagram 200 of the communication system managing the automatic conveyance of messages with users utilizing multiple messaging channels between computing systems, in which various embodiments of the present disclosure may be implemented. The description of the present embodiment herein utilizes examples from a job search intermediary providing communications with and between job providers and job seekers to further enable others of ordinary skill in the art to understand the embodiments disclosed herein. The present embodiment, including modifications and variations thereof, may be utilized in other hosted communication environments as will be apparent to those of ordinary skill in the art without departing from the scope and spirit of the described embodiments.

Referring to FIG. 1, a communication intermediary system 110 manages the conveyance of messages with users 120 through user interfaces 130 of various user computing systems 140 utilizing multiple messaging channels 150, including managing channel selection for each user. A large number of users 121, 122 and 129, user interfaces 131, 132 and 139, computing systems 141, 142 and 149, and channels 151, 152 and 159 may utilize the present embodiment concurrently. There may be additional users 120 beyond 121, 122 and 129 utilizing additional user interfaces and computing systems for sending and receiving messages across additional messaging channels.

Messaging channels 150 may be email, SMS (short message service) based texts, MMS notifications, Indeed Messaging products, Line Messaging, social media based applications such as WhatsApp and Facebook Messenger, web and app based push notifications, an automated phone calling system as well as other types of messaging channels that users may utilize to send and receive messages. Messaging channels 150 may be messaging applications that extend across multiple elements of FIG. 1, such as a social media application that includes a user interface as well as software implemented across multiple computing systems for sending a message to a user. Messaging channels may also include a software application residing on a computing device that utilizes existing infrastructure to send a message, such as by sending an SMS text or an automated phone call message. Computing systems 140 may be programmable consumer electronics such a mobile phones and pagers, hand-held or laptop devices, personal computer systems, server computer systems, thin clients, thick clients, multiprocessor systems, microprocessor-based systems, set top boxes, network PCs, minicomputer systems, mainframe computer systems, and distributed cloud computing environments that include any of the above systems or devices, and the like. Each user may utilize multiple computing systems to access and utilize each of the multiple messaging channels for that user. Each computing system 140 may utilize one or more user interfaces 130 to communicate with the user. For example, each computing system may utilize an operating systems with a general user interface, while each messaging channel (e.g., an internet browser, a social media messaging system) may utilize a user interface that operates on top of the operating system.

Communication intermediary system 110 includes a memory 112 that interfaces with a service manager 114. Memory 112 includes a set of content 116 and a set of user messaging preferences 118. Content 116 may include information provided by one of the users for storage and use in conveying messages. Service manager manages automatic services provided when conveying messages with users including automatic message scanning and cleaning, message classification, message conversion and channel selection such as described below. User messaging preferences 118 may include explicit messaging channel preferences provided by users for receiving messages as well as implicit messaging channel preferences which may have been discerned by intermediary system 110 from user behavior, context and other indications.

Users may receive and send messages, including messages originating from intermediary 110, utilizing different messaging channels at different times, locations, and other circumstances. For example, a user may select a channel for sending a first message and may select another channel for sending a second message. For another example, where a message has been sent to a user across multiple channels concurrently, the user may select a first messaging channel while at work to receive the message and may select another messaging channel while at home for receiving and responding to the message. In addition, while a user may prefer multiple channels for receiving messages, the user may vary in quickness of opening a message (referred to herein as a responsiveness metric) and likelihood in taking an action pursuant to that message (referred to herein as an effectiveness metric) based on the messaging channel utilized for conveying the message to the user. Furthermore, a user may become less responsive or less likely to take an action on a particular channel over time due to fatigue, particularly if that channel is overused. For example, if a user quickly opens any SMS texts sent to that user, that user may learn to become less responsive to texts if those texts are used frequently for non-urgent messages (referred to herein as a fatigue metric). Other metrics may be utilized for measuring channel performance. These responsiveness, effectiveness, fatigue and other metrics may be collectively referred to herein as messaging metrics when referring to specific measures and as performance metrics when referring to objectives of the system in channel selection.

Referring to FIG. 2, intermediary 110 may process communications with and among various users 120 across multiple messaging channels 150 through their user interfaces 130 and computing devices 140, such as described herein. In a first step 210, a user 121 registers with intermediary 110 and creates a user profile including a set of explicit messaging channel preferences, for messages addressed or otherwise designated to that user, stored in user preferences 118. This registration and profile creating process may be performed utilizing user interface 131 and user computing system 141, such as an internet browser on a laptop computer. For example, user 110 may prefer that administrative messages, such as a suggestion to update a user profile, be sent by email and/or SMS text. The same user may also prefer that personal communications be sent by SMS text and/or a social media messaging application such as WhatsApp or Facebook Messenger.

Then in step 220, users 120 may receive and send messages over a period of time utilizing messaging intermediary system 110. This includes receiving messages addressed or otherwise designated to those users from messaging intermediary system 110 and sending and receiving messages to/from other users through user interfaces 130, computing systems 140, messaging channels 150 and messaging intermediary 110 in accordance with user explicit messaging channel preferences 118. Generally such messages are conveyed by intermediary 110 with registered users, but some messages such as incoming messages may be conveyed to or from unregistered users. During this process of sending and receiving messages, the messages may be serviced by service manager 114 and supplemented or substituted with content from content 116. This includes automatically scanning each message for viruses and inappropriate content which may be removed, message classification based on keywords and other indicators, automatic channel selection based on the user preferences, automatic message conversion from the originating format into a format suitable for the selected message channel, automatic anonymization of certain aspects of the message in some circumstances including the use of aliases, automatically substitute some particulars of the message with a link to those particulars in content 116, and other automated services such as described below with reference to FIG. 4. For example, a job provider user 129 may send (i.e., address or designate) a message to a job seeker user 121 requesting an interview at a specific time and location with the job seeker.

Job provider user 129 may send the interview request message through email through user interface 139 on computing system 149 through message channel 159 to messaging intermediary system 110. Service manager 114 may then service the emailed interview request including storing most of the content of the message (including the time and location of the interview) in content 118 associated with an interview request link, identify that job seeker user 122 prefers receiving messages in an SMS text and in a WhatsApp message, convert the message to those formats including the linked content, then send the message to addressee job seeker 122 via SMS text and WhatsApp message through computing system 142 and user interface(s) 132. Job seeker user 122 may then open the message as an SMS text and then click on the link in that message to read about the time and location of the requested interview. Job seeker 122 may then respond back to job provider 129 by text or by another messaging channel, which may then be serviced and converted to the preferred message channel of the job provider. This process of communication between users through messaging intermediary system may continue for a period of time in accordance with the user preferences for receiving messages.

In a third step 230, which may occur concurrently with the above steps, a variety of messaging metrics, also referred to herein as context, are detected, compiled and stored in memory 112. In addition, historical information regarding the user may be identified and associated with the contextual information. Contextual information may include both situational and behavioral information. Contextual information for a message may include a channel utilized by a user for accessing that message, whether the user was active online on the channel at the time a message was sent to the user, a variety of timing information regarding that message, as well as attributes of the message itself. That is, each time a message is sent by intermediary 110 through one or more messaging channels 150 to a user 120, a variety of messaging metrics are detected and stored in memory 112. This includes the channel(s) utilized to send the message, whether the user is active on the channel(s) when the message is sent, the time the message is accessed by the user (if at all), the time the message is responded to by the user (if at all), and the channel utilized by the user to access and/or respond to the message. These compiled channel selections, user online activity and timing related to the message may then be utilized to determine the amount of time between the time the message was sent and the message was accessed and/or responded to by message channel to determine overall channel responsiveness and effectiveness for that user and in general. In addition, other attributes and metadata of the message and user may also be detected and either stored or associated with the messaging metrics including the type of message, whether the message requested an action, the type of user, the location of the user when the message was sent to, accessed by and responded by the user, etc. These other attributes allow further analysis of the effects of those attributes on channel responsiveness, effectiveness and fatigue towards identifying the optimum channel to utilize for improving the performance metrics as described below.

In a fourth step 240, which may occur concurrently with the above steps, each user's messaging channel selections, user activity and timing along with user and message attributes associated therewith, are analyzed, modeled and subsequently utilized to identify which channels optimally meet the performance metrics for the users. This optimization analysis and modeling may be performed by intermediary system 110 utilizing various statistical techniques such as regression analysis or through the use of machine learning or other artificial intelligence implementations of analytical model building to learn from data, identify patterns and identify the optimum channel. Other types of optimization analytics may also be utilized alone or in combination with statistical and machine learning analytics. Once a predetermined level of confidence threshold is reached with regards to one or more users, these optimization analytics may be utilized to generate implicit messaging channel selection preferences for those users in user channel preferences 118. That is, these implicit channel preferences may be utilized for channel selection for a given message type and user. These implicit channel preferences may be customized for each user and may utilize various user attributes. For example, the implicit channel selected may be based in part on the time of day or location of the user. These implicit channel preferences may be a subset of the explicit channel preferences for a given user. That is, when a user selects multiple channels for a given message type as explicit channel preferences, the implicit channel selection(s) may be one of the explicit channel selections. As a result of the storage of implicit channel preferences for a given user and message type, incoming messages of that type may subsequently be routed to the given user by intermediary 110 in accordance with the implicit channel preferences in step 220 above. Processing then continues through steps 210 through 240 repeatedly and continuously further improving the optimization analytics while accepting more users over time.

Figure 3:
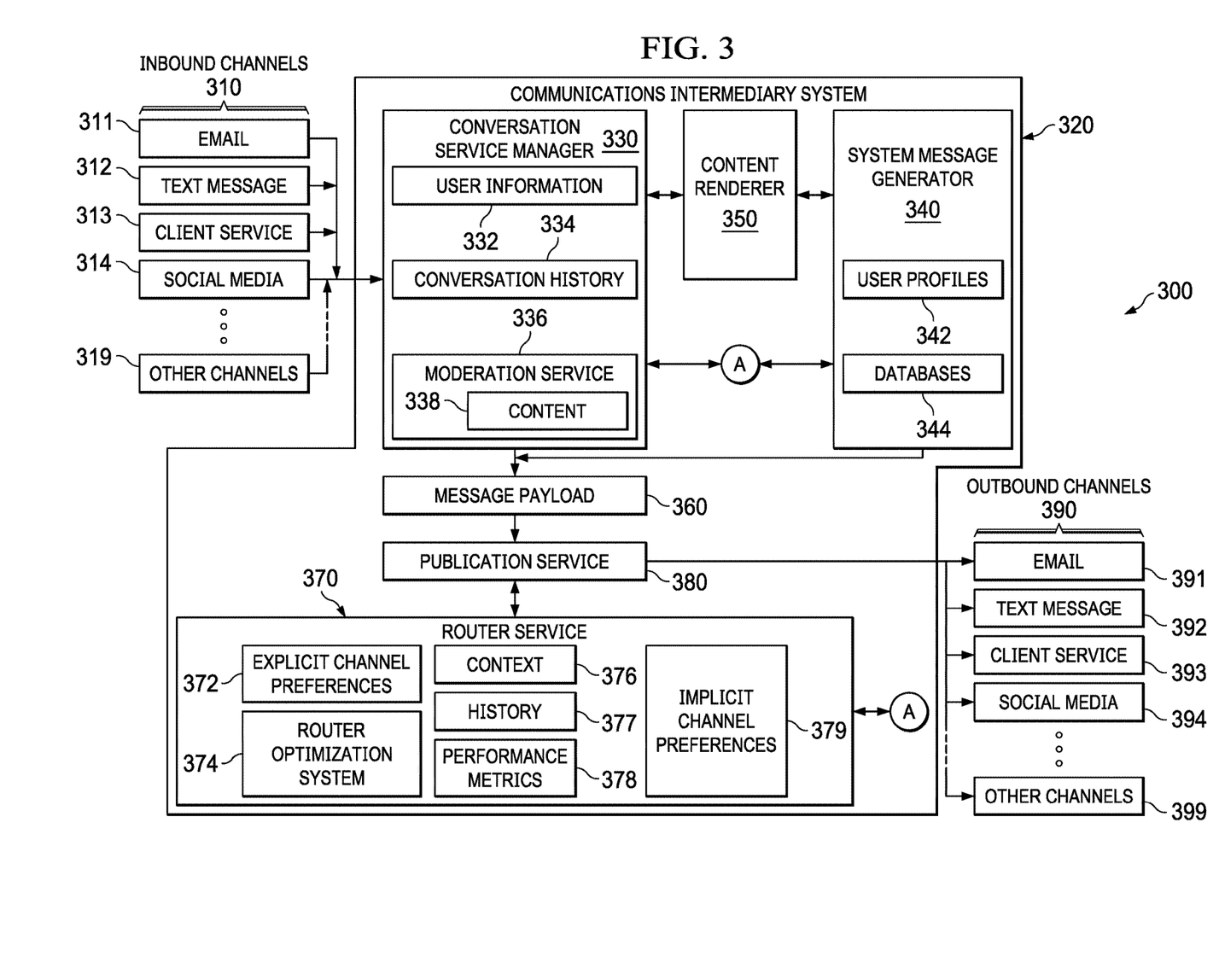
FIG. 3 provides a block diagram of the communication system managing the automatic conveyance of messages with users utilizing multiple messaging channels between computing systems, in which various embodiments of the present disclosure may be implemented.

FIG. 3 provides a block diagram of communication system 300 managing the automatic conveyance of messages with users utilizing multiple messaging channels between computing systems, in which various embodiments of the present disclosure may be implemented. The description of the present embodiment herein utilizes examples from a job search intermediary providing communications with and between job providers and job seekers to further enable others of ordinary skill in the art to understand the embodiments disclosed herein. The present embodiment, including modifications and variations thereof, may be utilized in other hosted communication environments as will be apparent to those of ordinary skill in the art without departing from the scope and spirit of the described embodiments.

Referring to FIG. 3, a communication intermediary system 320 manages the automatic conveyance of incoming messages on inbound channels 310 from originating users to recipient users as outgoing messages on outbound channels 390. In addition, communication intermediary system 320 manages the conveyance of system messages to addressee recipient users as outgoing messages on outbound channels 390. More particularly, incoming messages on inbound channels 310 are received by a conversation service manager 330, moderated by moderation service 346, with content rendered by message content renderer 350 into message payload 360, routed by router service 370 and sent to addressee recipient users by publication service 380 as outgoing messages in outbound channels 390. In addition, system messages are generated by system message generator 340 with content rendered by manager 350 into message payload 360, routed by router service 370 and sent to addressee recipient users by publication service 380 as outgoing messages on outbound channels 390. Not shown in FIG. 3, but shown in FIG. 1, are users communicating through user interfaces on computing devices across channels 310 and 390.

Incoming messages from originating users include multiple inbound channels 310 such as email 311, SMS (short message service) based texts 312, a proprietary client service 313, social media based applications 314 such as WhatsApp and Facebook Messenger, as well as other channels 319 such as MMS notifications, Indeed Messaging products, an automated phone calling system, web and app based push notifications, and other types of messaging channels that originating users may utilize to send messages. Similarly, outgoing messages sent to recipient users include multiple outbound channels 390 such as email 391, SMS (short message service) based texts 392, a proprietary client service 393, social media based applications 394 such as WhatsApp and Facebook Messenger, as well as other channels 399 such as MMS notifications, Indeed Messaging products, an automated phone calling system, web and app based push notifications, and other types of messaging channels that originating users may utilize to send messages.

Conversations between users may be ongoing whereby a first user may send an incoming message across inbound channel 310 through intermediary 320 to a second user as an outgoing message on outbound channel 390. In the present embodiment, the second user reply to that message would be treated as an incoming message on inbound channel 310 through intermediary 320 to the first user as an outgoing message on outbound channel 390.

Conversation service manager 330 may include a set of user information 332, conversation history 334 and moderation service manager 336. User information 332 includes user identifiers, user aliases and additional information regarding users to manage ongoing conversations between users. Much of this user information may also be stored in user profile database 342 and cross-linked with the use of user identifiers. Conversation history 336 includes a history of ongoing conversations between users grouped by those users identified in an ongoing conversation. For examples, conversations may include two persons or larger groups of persons who each receive a copy of each ongoing message. Through the use of user information 332 and conversation history 334, conversation service manager may utilize aliases for substituting email addresses, phone numbers, and other potentially sensitive identifying information with user aliases. The use of aliases and prior conversation history in messages may also encourage continued and ongoing conversations through conversation service manager 330.

Conversation service manager 330 also includes moderation services 346, which provides a variety of services to messages such as described below with reference to FIG. 4. For example, moderation services may include automatic message scanning and cleaning to remove viruses and inappropriate content, message categorization (also referred to herein as message classification) to identify the type (also referred to herein as category) of message being conveyed, message content substitution to substitute some content with a link (with storage in content 338), and message conversion to a message payload 360 with the services of message content renderer 350.

System message generator 340 provides a variety of system messages to users based on user profiles 342 and a variety of databases 344 which may be utilized to determine what a given user may find useful and helpful. For example, a job seeker may need to periodically update their user profile, including their resume. For another example, based on job postings by job providers, a user may be sent a list of jobs which fit that user's profile. These types of system generated messages may fall into a variety of categories as described further herein. System message generator may utilize content renderer 350 in generating a message payload suitable for sending the message to any of a variety of channels for a given user.

Content renderer 350 includes a variety of software tools for assisting in generating a message package from a message originating from any of inbound channels 310. For example, a message may come in an SMS text utilizing raw text which may need to be converted to HTML (HyperText Markup Language) based text for use in a social media messaging service. Content renderer 350 may also provide other tools such as a link generator for use in content substitution such as described herein with reference to moderation service 346.

Message payload 360 includes information needed for publication service to send a message to the recipient users in the form needed for any given channel which may be specified by router service 370. That is, in the present embodiment, message payloads are messages with all the information and content needed to send that message to the recipient user(s) across any outbound channel. Alternative embodiments may utilize router service 370 further upstream to reduce the message payload needed for sending a message to a limited number of channels. For example, in such an alternative embodiment, once an incoming message has been categorized, the explicit preferences of the recipient user(s) or the implicit preferences generated by router 370 may be utilized to reduce the content rendering and other formatting needed to publish that message to a limited number of outbound channels.

Router service 370 provides instructions to publication service 380 of which channel(s) 390 to send a message in message payload 360 to recipient users(s). Router service 370 also has communication pathways (A) with conversation service manager 330 and system message generator 340 as needed to obtain information regarding messages and users to perform the functions described below. Router service 370 includes explicit user channel preferences 372, router optimization system 374, context 376, history 377, performance metrics 378 and implicit channel preferences 379. Explicit user preferences 372 include the channel preferences of a user by message category. For example, a user may request that certain types of messages be sent by WhatsApp messenger and SMS text and other types or categories of messages be sent by email or other channels. Router optimization system 374 may include analysis, modeling and decision making software for identifying and selecting an optimum implicit channel preference for a given user and message type in accordance with the performance metrics specified for that message type given the prior behavioral and situational information available. This behavioral and situational information includes context 376, history 377, as well as other information regarding the user which may be accessed from user profile 342. Context 376, also referred to as messaging metrics, may include the location, online status, date and time, sender, and other information which can be detected when a user receives, accesses or responds to a message. History 377 can include information regarding the user such a recent searches, submissions, responses, clicks, and other behavior which can be detected over time. Information regarding the user from that user's profile may also be utilized as historical information. For example, historical information can include information regarding a user clicking on or querying about job postings, submitting job applications, changing their employment status in their user profile, etc. Performance metrics 378 include the metrics to be applied when identifying an optimum channel for use with a given user and message category. Performance metrics can include responsiveness, effectiveness and fatigue metrics such as described above. Router optimization system 374 may then generate a set of implicit channel preferences 379 by user and message category utilizing context 376 and history 377 to identify the optimum channel given performance metrics 378 for that user and message category. This can include identifying that the message not be sent (or be sent to a null channel) to reduce user fatigue for certain users and message types. This optimization analysis and modeling may be performed utilizing various statistical techniques such as regression analysis or through the use of machine learning or other artificial intelligence implementations of analytical model building to learn from data, identify patterns and identify the optimum channel. Other types of optimization analytics may also be utilized alone or in combination with statistical and machine learning analytics. In the present embodiment, implicit channel preferences 379 are a subset of explicit channel preferences 374 by user and message category.

Publication service 380 then formats and sends messages from message payload 360 in accordance with the channels identified provided by router service 370 to the recipient user(s). As described above, this channel selection may vary by user and message category. Publication service 380 may also not send a message of a particular category if that is what is recommended by router service 370, such as for preventing user fatigue. For example, general information regarding industry news may not be sent to a user, information regarding a job opening matching that user's profile may be sent by SMS text to that user and a separate message to that same user regarding updating their resume may be sent by email.

Figure 4A:
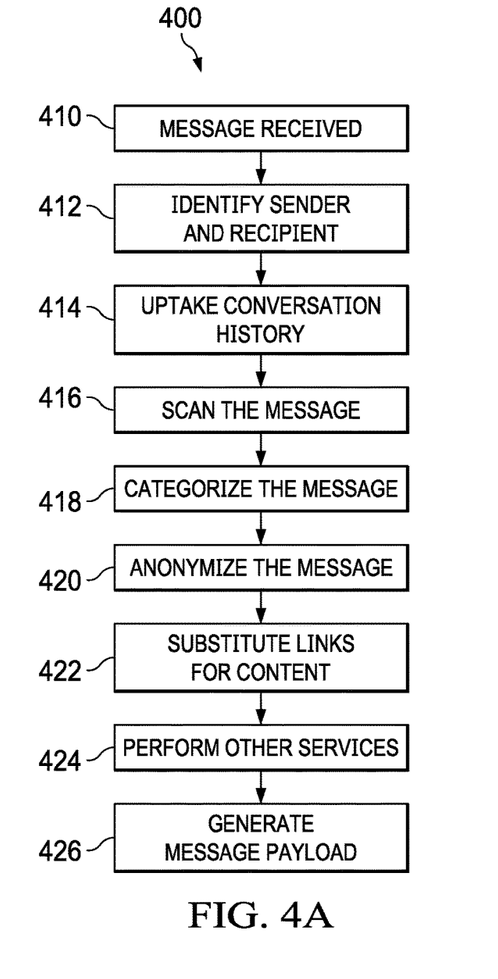
FIGS. 4A-4C provide flow diagrams of elements of the communication system managing the automatic conveyance of messages utilizing multiple messaging channels, in which various embodiments of the present disclosure may be implemented.
Figure 4B:
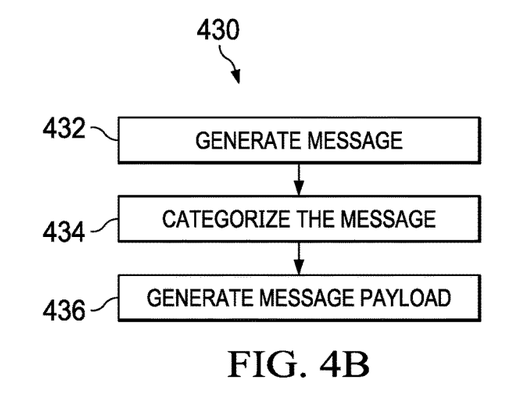
Figure 4C:
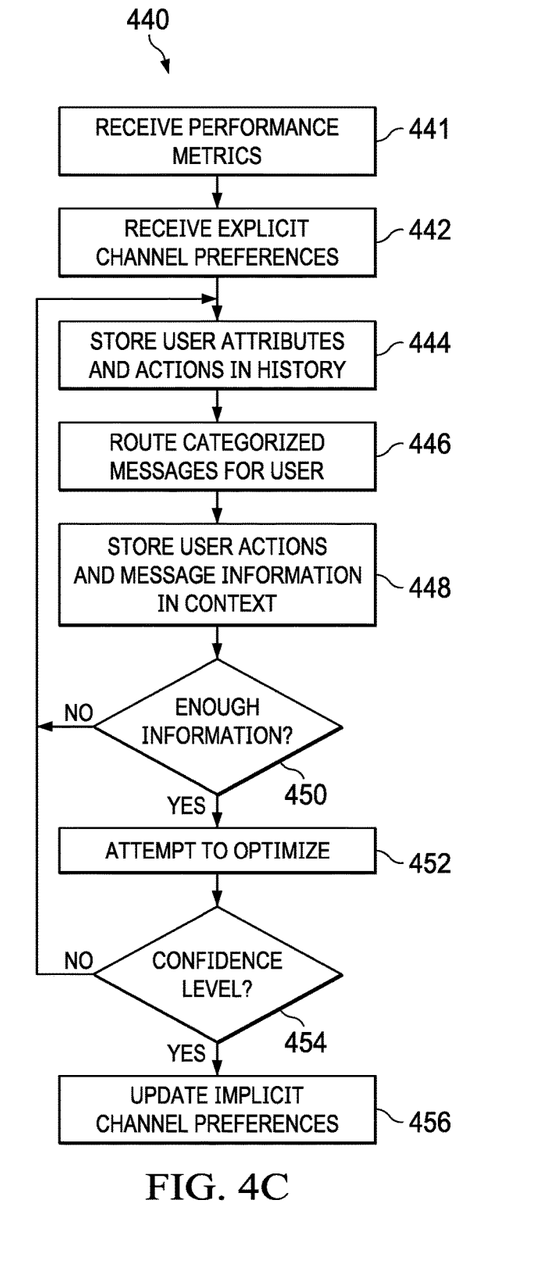

FIGS. 4A-4C provide of flow diagrams of elements of the communication system 300 managing the automatic conveyance of messages utilizing multiple messaging channels, in which various embodiments of the present disclosure may be implemented. The overall flow of the operation of an intermediary system was described above with reference to FIG. 2.

FIG. 4A provides a flow diagram 400 of a conversation service manager 330 receiving an incoming message across an inbound channel 310, servicing that incoming message, and generating a message payload 360 for routing and publishing the message onto outbound channel 390. This process assumes users have already created user profiles and channel preferences such as described above with reference to FIG. 1.

In a first step 410, a message is received from an inbound channel 310. In step 412, the originator(s) and recipient(s) of the message are automatically identified from user information 332. Then in step 414, the conversation history between these originators and recipients is automatically updated accordingly. In this step, and in the below steps, content renderer 350 may be utilized as needed to translate and convert elements of the message for processing. In step 416, moderation service 336 automatically scans the incoming message for viruses and inappropriate content. If found, those viruses and content may be removed or otherwise cured and user information 332 is updated identifying these issues. If this has become problematic for a given user, additional actions may be taken such as suspending a user's capability to send and receive messages. In step 418, moderation service 336 also automatically classifies (also referred to herein as categorizes) the message into a variety of message categories (also referred to herein as message types). In the present embodiment, this can include responses to prior conversations, new resume contacts from job providers based on the user's resume in user profile 342, etc. This classification can be determined from the originating user's profile (e.g., a job provider), the subject line referencing a job, keyword searches, and other types of categorization tools. This classification is subsequently utilized by router service 370 as described below. Then in step 420, moderation service 336 may perform automatic anonymization of certain aspects of the message in some circumstances including the use of aliases. Furthermore, in step 422, moderation service 336 may automatically substitute some particulars of the message with a link to those particulars in content 338. By providing a link instead of the content, communication system 320 can better detect whether a user has accessed that message when the link is accessed by that user in an outgoing message. In step 424, moderation service 336 may perform other automated services such as calendar updates to user profiles 342, updates to databases 344, context 376 and history 377 regarding user or message attributes, etc. Then in step 426, conversation service manager utilizes content renderer 350 to generate a message payload 360 with the message and relevant information needed to route and publish the message to the outbound channel(s) as described herein.

FIG. 4B provides a flow diagram 430 of a system message generator 340 generating a message payload 360 for routing and publishing the message onto outbound channel 390. In step 432, system message generator, based on user profiles 342 and databases 344, generates a message for sending to a given user(s). Then in step 434, this message is categorized for use by router service 370 as described herein. This message can be one or more of several categories of system generated messages including a set of job and company alerts to a job seeker, a set of links to resumes of qualified job seekers to a job provider, an update status of a previous job application submission, periodic career guidance, etc. Then in step 436, system message generator 340 utilizes content renderer 350 to generate a message payload 360 with the message and relevant information needed to route and publish the message to the outbound channel(s) as described herein. Because system messages are not from external sources, there is much less need for services such as provided by moderation service 336 in conversation service 330.

FIG. 4C is a flow diagram 440 of router service 370 utilizing router optimization system 374 to generate implicit channel preferences 379 for a given user. In a first step 441, a set of performance metrics 378 are received, such as by an administrator of communications system 300. The performance metrics are the various metrics to be utilized by router service 370 to optimize channel selection for each user and message category. These may be responsiveness metrics, efficiency metrics, fatigue metrics, and other metrics which an administrator may specify. In a second step 442, explicit channel preferences are received from the user during a user registration process (or updated later by that user) for storage in explicit channel preferences 372. These explicit channel preferences are by message category and specific for that user. The default value may be all channels for each message category or a generally accepted subset of channels. Then in step 444, in response to the user performing certain actions such as job search queries, clicking on specific job postings, submitting job applications, etc., those actions are detected and stored in history 377 along with other attributes from user profile 342. Also, in step 446, in response to the user receiving messages across inbound channels 310, those messages are categorized by conversation service manager 330 and forwarded to the user based on the explicit channel preferences as provided by router service 370 to publication service 370. Then in step 448, in response to the message being sent and the user accessing and/or responding to those messages, certain contextual information regarding the message and the user's actions are stored in context 376. This can include the location of the user, whether the user was active online when the message was sent on that channel to the user, the time and date the message was forwarded to the user, the originating user of the message, etc.

At this point, after the user has developed a threshold amount of context 376 and history 377, router optimization system 374 may determine in step 450 whether there is enough information to optimize the channel selections for messages to the user. This may be a certain amount of time, a certain amount of messages received, a certain amount of on-line activity with the system, etc. If no, then processing returns to step 444 for continued activity by the user. If yes, then in step 452 the router optimization service may attempt to optimize the explicit channel preferences of the user through analytics and modeling. This optimization analysis and modeling may be performed utilizing various statistical techniques such as regression analysis or through the use of machine learning or other artificial intelligence implementations of analytical model building to learn from data, identify patterns and identify the optimum channel. Other types of optimization analytics may also be utilized alone or in combination with statistical and machine learning analytics. The results of these analytics and modeling are then analyzed in step 454 for a level of confidence. Level of confidence step 454 may be performed separately for each message category for the given user. If the level of confidence does not reach a predetermined threshold, then processing returns to step 444 above, otherwise processing continues to step 456. Once a predetermined level of confidence threshold is reached, in step 456 these optimization analytics and models may be utilized to generate implicit messaging channel selection preferences for the given users in implicit channel preferences 379. That is, these implicit channel preferences may be utilized for channel selection for a given message category and user. As described herein, these implicit channel preferences may be customized for each user and may utilize various user attributes. For example, the implicit channel selected may be based in part on the time of day or location of the user. These implicit channel preferences may be a subset of the explicit channel preferences for a given user. That is, when a user selects multiple channels for a given message type as explicit channel preferences, the implicit channel selection(s) may be one of the explicit channel selections. As a result of the storage of implicit channel preferences for a given user and message type, incoming messages of that type may subsequently be routed to the given user by router service 370 in accordance with the implicit channel preferences 379. Processing then returns to step 444 above for continued processing of the present embodiment. Steps 444 through 456 may be repeated continuously and periodically to continually improve the optimization of channel preferences for users and message categories.

Figure 5:
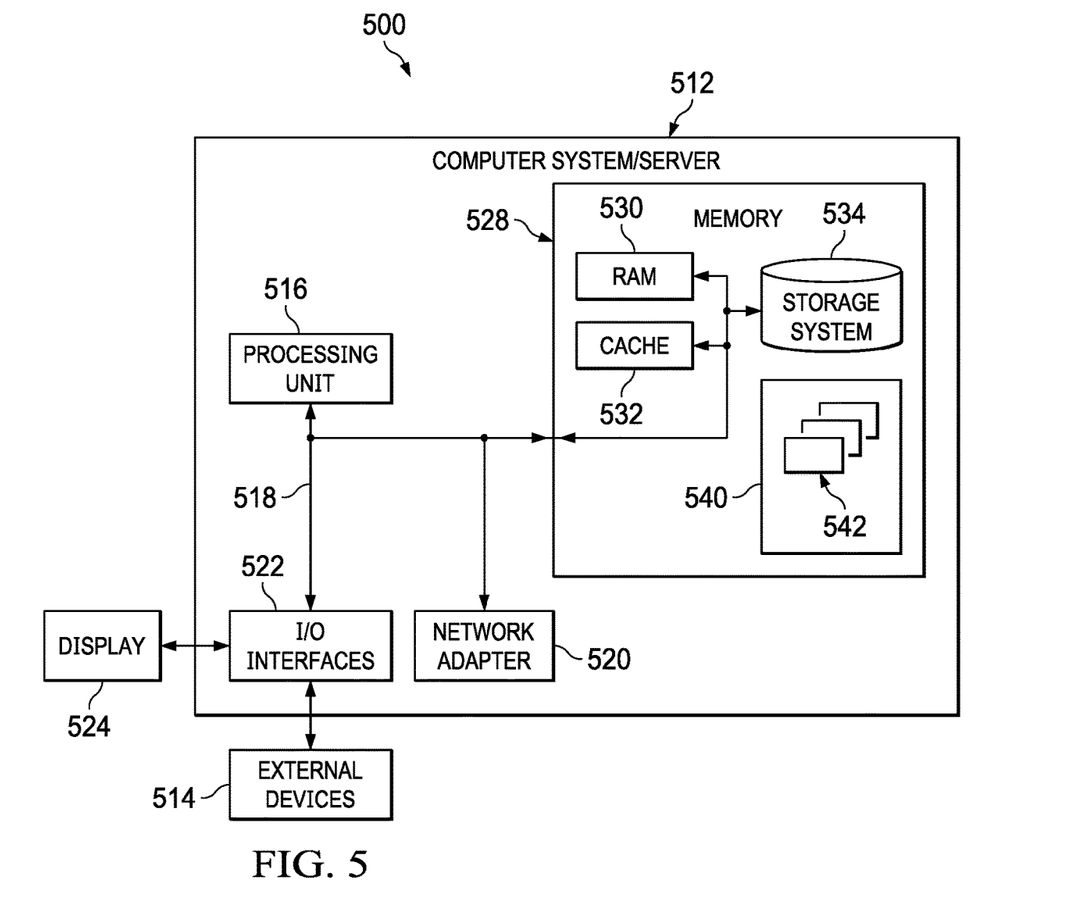
FIG. 5 provides a block diagram of an illustrative data processing system in which various embodiments of the present disclosure may be implemented.

FIG. 5 provides a block diagram of an illustrative data processing system in which various embodiments of the present disclosure may be implemented. Data processing system 500 is one example of a suitable data processing system and is not intended to suggest any limitation as to the scope of use or functionality of the embodiments described herein. Regardless, data processing system 500 is capable of being implemented and/or performing any of the functionality set forth herein such as automatically managing the conveyance of messages with users across multiple messaging channels between computing systems including managing channel selection for each user.

In data processing system 500 there is a computer system/server 512, which is operational with numerous other computing system environments, peripherals, or configurations. Examples of well-known computing systems, environments, and/or configurations that may be suitable for use with computer system/server 512 include, but are not limited to, programmable consumer electronics such a mobile phones and pagers, hand-held or laptop devices, personal computer systems, server computer systems, thin clients, thick clients, multiprocessor systems, microprocessor-based systems, set top boxes, network PCs, minicomputer systems, mainframe computer systems, and distributed cloud computing environments that include any of the above systems or devices, and the like.

Computer system/server 512 may be described in the general context of computer system-performable instructions, such as program modules, being processed by a computer system. Generally, program modules may include routines, programs, objects, components, logic, data structures, and so on that perform particular tasks or implement particular abstract data types. Computer system/server 512 may be practiced in distributed computing environments where tasks are performed by remote processing devices that are linked through a communications network. In a distributed computing environment, program modules may be located in both local and remote computer system storage media including memory storage devices. For example, the present invention may be implemented in a cloud computing environment, distributed or otherwise, which may be virtualized such as with the use of a hypervisor managing multiple nodes including virtual processors, virtual memory, etc.

As shown in FIG. 5, computer system/server 512 in data processing system 500 is shown in the form of a computing device configured with other computing devices of, for example the same or similar type, to implement a system and method of automatically managing the conveyance of messages with users across multiple messaging channels between computing systems including managing channel selection for each user. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of non-transitory computer system usable media. Such media may be any available media that is accessible by computer system/server 512, and it includes both volatile and non-volatile media, removable and non-removable media.

System memory 528 can include non-transitory computer system readable media in the form of volatile memory, such as random access memory (RAM) 530 and/or cache memory 532. Computer system/server 512 may further include other non-transitory removable/non-removable, volatile/non-volatile computer system storage media. By way of example, storage system 534 can be provided for reading from and writing to a non-removable, non-volatile magnetic media (not shown and typically called a "hard drive"). Although not shown, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 518 by one or more data media interfaces. Memory 528 may include at least one program product having a set (e.g., at least one) of program modules that are configured to carry out the functions of the embodiments. Memory 528 may also include data that will be processed by a program product.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of the embodiments. For example, a program module may be software for automatically managing the conveyance of messages with users across multiple messaging channels between computing systems including managing channel selection for each user.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via I/O interfaces 522 through wired connections or wireless connections. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, tape drives, RAID systems, redundant processing units, data archival storage systems, external disk drive arrays, etc.

Figure 6:
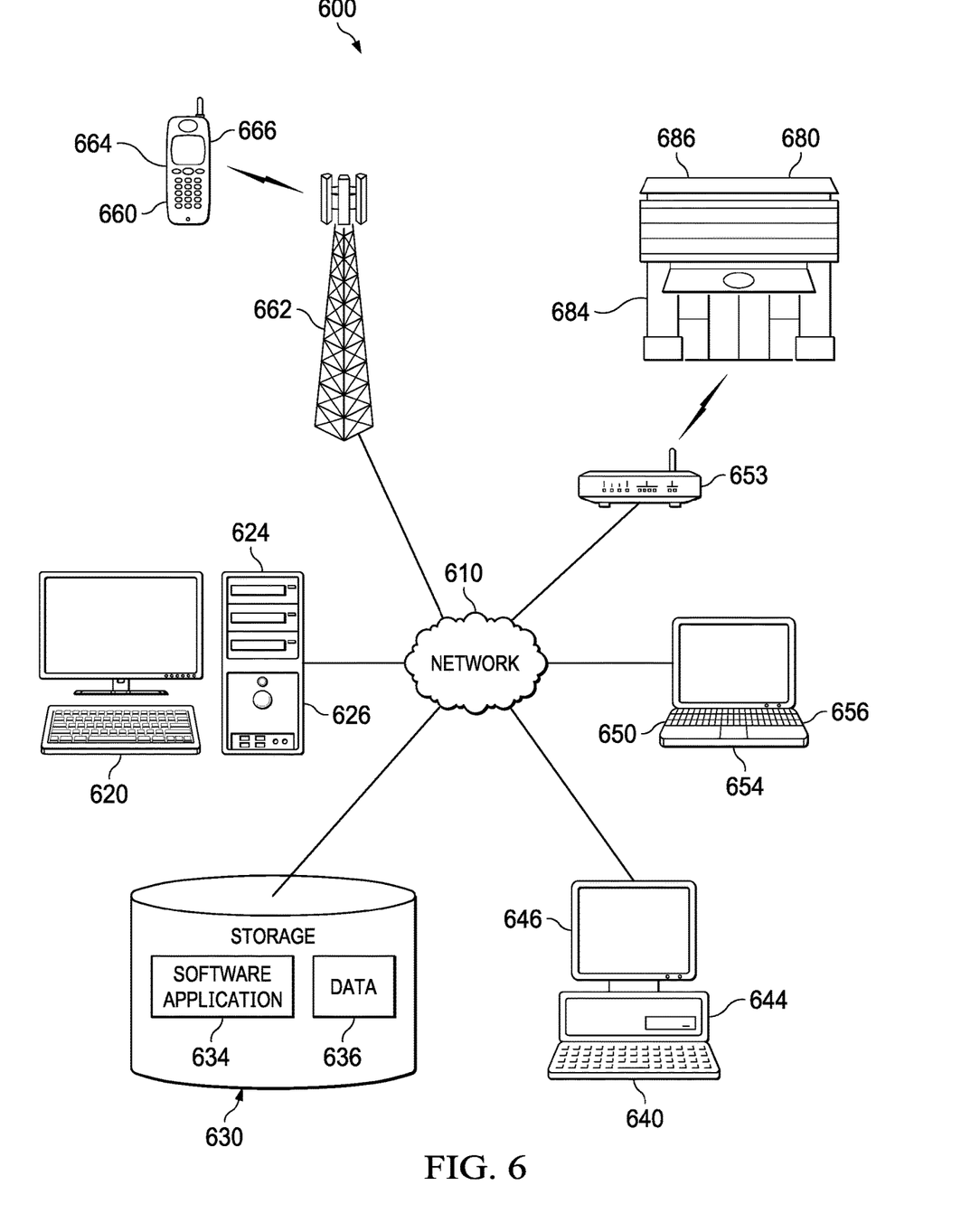
FIG. 6 provides a block diagram of an illustrative network of data processing systems in which various embodiments of the present disclosure may be implemented.

FIG. 6 provides a block diagram of an illustrative network of data processing systems in which various embodiments of the present disclosure may be implemented. Data processing environment 600 is a network of data processing systems such as described above with reference to FIG. 5. Software applications such as for automatically managing the conveyance of messages with users across multiple messaging channels between computing systems including managing channel selection for each user may be processed on any computer or other type of data processing system in data processing environment 600. Data processing environment 600 includes network 610. Network 610 is the medium used to provide simplex, half duplex and/or full duplex communications links between various devices and computers connected together within data processing environment 600. Network 610 may include connections such as wire, wireless communication links, or fiber optic cables.

Server 620 and client 640 are coupled to network 610 along with storage unit 630. In addition, laptop 650 and facility 680 (such as a home or business) are coupled to network 610 including wirelessly such as through a network router 653. A mobile device 660 such as a mobile phone may be coupled to network 610 through a cell tower 662. Data processing systems, such as server 620, client 640, laptop 650, mobile device 660 and facility 680 contain data and have software applications including software tools processing thereon. Other types of data processing systems such as personal digital assistants (PDAs), smartphones, tablets and netbooks may be coupled to network 610.

Server 620 may include software application 624 and data 626 for automatically managing the conveyance of messages with users across multiple messaging channels between computing systems including managing channel selection for each user or other software applications and data in accordance with embodiments described herein. Storage 630 may contain software application 634 and a content source such as data 636 for automatically managing the conveyance of messages with users across multiple messaging channels between computing systems including managing channel selection for each user. Other software and content may be stored on storage 630 for sharing among various computer or other data processing devices. Client 640 may include software application 644 and data 646. Laptop 650 and mobile device 660 may also include software applications 654 and 664 and data 656 and 666. Facility 680 may include software applications 684 and data 686 on local data processing equipment. Other types of data processing systems coupled to network 610 may also include software applications. Software applications could include a web browser, email, or other software application for automatically managing the conveyance of messages with users across multiple messaging channels between computing systems including managing channel selection for each user.

Server 620, storage unit 630, client 640, laptop 650, mobile device 660, and facility 680 and other data processing devices may couple to network 610 using wired connections, wireless communication protocols, or other suitable data connectivity. Client 640 may be, for example, a personal computer or a network computer.

In the depicted example, server 620 may provide data, such as boot files, operating system images, and applications to client 640 and laptop 650. Server 620 may be a single computer system or a set of multiple computer systems working together to provide services in a client server environment. Client 640 and laptop 650 may be clients to server 620 in this example. Client 640, laptop 650, mobile device 660 and facility 680 or some combination thereof, may include their own data, boot files, operating system images, and applications. Data processing environment 600 may include additional servers, clients, and other devices that are not shown.

In the depicted example, data processing environment 600 may be the Internet. Network 610 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 600 also may be implemented as a number of different types of networks, such as for example, an intranet, a local area network (LAN), or a wide area network (WAN). FIG. 6 is intended as an example, and not as an architectural limitation for the different illustrative embodiments.

Among other uses, data processing environment 600 may be used for implementing a client server environment in which the embodiments may be implemented. A client server environment enables software applications and data to be distributed across a network such that an application functions by using the interactivity between a client data processing system and a server data processing system. Data processing environment 600 may also employ a service oriented architecture where interoperable software components distributed across a network may be packaged together as coherent business applications.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction processing device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or other programming languages such as Java. The computer readable program instructions may be processed entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may process the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a special purpose machine, such that the instructions, which are processed via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which are processed on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more performable instructions for implementing the specified logical function(s). In some alternative implementations, the functions noted in the blocks may occur out of the order noted in the Figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A data processing system suitable for storing and/or processing program code will include at least one processor coupled directly or indirectly to memory elements through a system bus. The memory elements can include local memory employed during actual processing of the program code, bulk storage media, and cache memories, which provide temporary storage of at least some program code in order to reduce the number of times code must be retrieved from bulk storage media during processing.

A data processing system may act as a server data processing system or a client data processing system. Server and client data processing systems may include data storage media that are computer usable, such as being computer readable. A data storage medium associated with a server data processing system may contain computer usable code such as for automatically managing the conveyance of messages with users across multiple messaging channels between computing systems including managing channel selection for each user. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of automatically managing the conveying of messages among multiple communication channels, the method comprising:
   receiving, from a first computing system, an on-line message addressed to a user;
   automatically categorizing the message among a predetermined set of message categories stored in memory;
   identifying a set of on-line messaging channels preselected by the addressee user for receiving messages for each of the predetermined set of message categories;
   identifying a set of performance metrics stored in memory for optimizing messaging channel selection;
   utilizing the performance metrics to automatically select an optimum messaging channel from the preselected messaging channels for sending the categorized message to a second computing system of the addressee user;
   automatically formatting the categorized message for the optimum messaging channel; and
   sending the formatted message on-line to the second computing system of the addressee user across the optimum messaging channel.

2. The method of claim 1 wherein the on-line message addressed to the user is received from an originating user through a messaging channel different from the optimum messaging channel utilized to send the formatted message to the addressee user.

3. The method of claim 1 wherein the on-line message addressed to the user is system generated utilizing information obtained from a user profile previously provided by the user.

4. The method of claim 1 further comprising:
   detecting messaging channels previously utilized by the user with prior messages addressed to that user; and
   utilizing the detected messaging channels to automatically select the optimum messaging channel.

5. The method of claim 4 further comprising:
   utilizing previously detected on-line behavior of the user on computing systems to automatically select the optimum messaging channel.

6. The method of claim 5 wherein machine learning is utilized to automatically select the optimum messaging channel.

7. The method of claim 4 further comprising:
   determining a level of confidence in selecting the optimum messaging channel;

comparing the level of confidence with a threshold; and
utilizing the optimum messaging channel to send the formatted message if the level of confidence exceeds the threshold.

8. A computer program product for automatically managing the conveying of messages among multiple communication channels, the computer program product comprising a computer readable storage medium having program instructions embodied therewith, the program instructions processed by a processing circuit to cause the device to perform operations comprising:
receiving, from a first computing system, an on-line message addressed to a user;
automatically categorizing the message among a predetermined set of message categories stored in memory;
identifying a set of on-line messaging channels preselected by the addressee user for receiving messages for each of the predetermined set of message categories;
identifying a set of performance metrics stored in memory for optimizing messaging channel selection;
utilizing the performance metrics to automatically select an optimum messaging channel from the preselected messaging channels for sending the categorized message to a second computing system of the addressee user;
automatically formatting the categorized message for the optimum messaging channel; and
sending the formatted message on-line to the second computing system of the addressee user across the optimum messaging channel.

9. The computer program product of claim 8 wherein the on-line addressed to the user is received from an originating user through a messaging channel different from the optimum messaging channel utilized to send the formatted message to the addressee user.

10. The computer program product of claim 8 wherein the on-line addressed to the user is system generated utilizing information obtained from a user profile previously provided by the user.

11. The computer program product of claim 8 the operations further comprising:
detecting messaging channels previously utilized by the user with prior messages addressed to that user; and
utilizing the detected messaging channels to automatically select the optimum messaging channel.

12. The computer program product of claim 8 the operations further comprising:
utilizing previously detected on-line behavior of the user on computing systems to automatically select the optimum messaging channel.

13. The computer program product of claim 12 wherein machine learning is utilized to automatically select the optimum messaging channel.

14. The computer program product of claim 11 the operations further comprising:
determining a level of confidence in selecting the optimum messaging channel;
comparing the level of confidence with a threshold; and
utilizing the optimum messaging channel to send the formatted message if the level of confidence exceeds the threshold.

15. A data processing system for automatically managing the conveying of messages among multiple communication channels, the data processing system comprising:
a processor; and
a memory storing program instructions which when processed by the processor cause the processor to:
receive, from a first computing system, an on-line message addressed to a user;
automatically categorize the message among a predetermined set of message categories stored in memory;
identify a set of on-line messaging channels preselected by the addressee user for receiving messages for each of the predetermined set of message categories;
identify a set of performance metrics stored in memory for optimizing messaging channel selection;
utilize the performance metrics to automatically select an optimum messaging channel from the preselected messaging channels for sending the categorized message to a second computing system of the addressee user;
automatically format the categorized message for the optimum messaging channel; and
send the formatted message on-line to the second computing system of the addressee user across the optimum messaging channel.

16. The data processing system of claim 15 wherein the on-line addressed to the user is received from an originating user through a messaging channel different from the optimum messaging channel utilized to send the formatted message to the addressee user.

17. The data processing system of claim 15 wherein the on-line addressed to the user is system generated utilizing information obtained from a user profile previously provided by the user.

18. The data processing system of claim 15 wherein the instructions when processed by the processor cause the processor to:
detect messaging channels previously utilized by the user with prior messages addressed to that user; and utilizing the detected messaging channels to automatically select the optimum messaging channel.

19. The data processing system of claim 18 wherein the instructions when processed by the processor further cause the processor to:
utilize previously detected on-line behavior of the user on computing systems to automatically select the optimum messaging channel.

20. The data processing system of claim 19 wherein machine learning is utilized to automatically select the optimum messaging channel.

21. The data processing system of claim 18 wherein the instructions when processed by the processor further cause the processor to:
determine a level of confidence in selecting the optimum messaging channel;
compare the level of confidence with a threshold; and
utilize the optimum messaging channel to send the formatted message if the level of confidence exceeds the threshold.

* * * * *